(12) United States Patent
Iwai

(10) Patent No.: US 7,213,952 B2
(45) Date of Patent: May 8, 2007

(54) INTERIOR ILLUMINATOR FOR AUTOMOBILE

(75) Inventor: Shiro Iwai, Niiza (JP)

(73) Assignee: Honda Access Corporation, Saitama (JP)

( * ) Notice: Subject to any disclaimer, the term of this patent is extended or adjusted under 35 U.S.C. 154(b) by 64 days.

(21) Appl. No.: 11/093,047

(22) Filed: Mar. 30, 2005

(65) Prior Publication Data

US 2005/0219853 A1    Oct. 6, 2005

(30) Foreign Application Priority Data

Mar. 31, 2004    (JP) .............................. 2004-106846

(51) Int. Cl.
*B60Q 3/00* (2006.01)
(52) U.S. Cl. ...................... 362/488; 362/223; 362/363; 362/364; 362/576; 362/459; 362/487
(58) Field of Classification Search ................ 362/223, 362/363, 364, 479, 490, 488, 551, 576
See application file for complete search history.

(56) References Cited

U.S. PATENT DOCUMENTS 6,402,354 B1 *  6/2002  Tatewaki et al. ............ 362/490

FOREIGN PATENT DOCUMENTS

| DE | 10259236 A1 | 7/2004 |
|----|----|----|
| EP | 1 270 331 A1 | 1/2003 |
| FR | 2830493 A3 | 4/2003 |
| JP | 2-74246 | 6/1990 |
| JP | 10-129345 | 5/1998 |
| JP | 2000-177482 | 6/2000 |
| JP | 2001-138808 | 5/2001 |
| JP | 2003127769 | 5/2003 |
| WO | WO 2005/007450 A1 | 1/2005 |

OTHER PUBLICATIONS

Office Action dated Feb. 27, 2007 issued in priority claimed Japanese patent application JP 2004-106846.

* cited by examiner

*Primary Examiner*—Renee Luebke
*Assistant Examiner*—Mary Zettl
(74) *Attorney, Agent, or Firm*—Westerman, Hattori, Daniels & Adrian, LLP.

(57) ABSTRACT

To provide an interior illuminator for an automobile that can produce a decorative effect by illumination in addition to illuminating the interior of the automobile and has a simple structure and a small size. A secondary light emitting unit is provided around primary light emitting units 5 and 6 for illuminating the interior of the automobile. A housing 2 that holds the primary light emitting units 5, 6 and the secondary light emitting unit is provided. The secondary light emitting unit has a U-shaped light guide body 21, light emitting elements 8 and 9 for launching light into the light guide body at the ends thereof, and a light emitting element control unit 11 for controlling the light emitting elements 8 and 9. The housing 2 has a light guide body holding groove that holds the light guide body 21, insertion holes for introducing the light guide body into the housing at the ends of the light guide body holding groove, and a housing section that houses the light emitting element and the light emitting element control unit.

5 Claims, 15 Drawing Sheets

INTERIOR ILLUMINATOR FOR AUTOMOBILE

BACKGROUND OF THE INVENTION

1. Field of the Invention

The present invention relates to an interior illuminator for an automobile which is provided on the ceiling of the automobile and illuminates the interior of the automobile.

2. Description of the Related Art

Conventional known illuminators for illuminating the interior of an automobile include one using a plurality of lamps as a light source (see Japanese Patent Laid-Open No. 2000-177482) and one using a fluorescent lamp as a light source (see Japanese Patent Laid-Open No. 10-129345).

As for the automobile, the recent trend is toward a wider interior space and a higher riding capacity, and it is desired that the illumination produces a decorative effect for occupants on the backseat. However, conventional illuminators are designed primarily for interior illumination and emit relatively intense light, and therefore, there is a problem that an atmosphere desired by an occupant cannot be easily produced inside the automobile.

Thus, to provide a decorative effect in addition to simply illuminating the interior of the automobile, an additional light emitting device other than the illuminator has to be attached anywhere in the automobile. In this case, however, there are problems that the space for accommodating the additional light emitting device has to be provided, the wiring becomes complicated, and the attaching operation become burdensome.

To solve the problems described above, an object of the present invention is to provide an interior illuminator for an automobile that can produce a decorative effect by illumination in addition to illuminating the interior of the automobile and has a simple structure and a small size.

SUMMARY OF THE INVENTION

In order to attain the object described above, the present invention provides an interior illuminator for an automobile that is attached to a ceiling of the automobile, comprising a primary light emitting unit for illuminating the interior of the automobile, a secondary light emitting unit provided around the primary light emitting unit, and a housing that holds the primary light emitting unit and the secondary light emitting unit, in which the secondary light emitting unit has a transparent light guide body that is flexible and U-shaped, light emitting elements for launching light into the light guide body at the ends thereof, and a light emitting element control unit for controlling light emission of the light emitting elements, and the housing has a light guide body holding groove that keeps the U-shape of the light guide body, a pair of insertion holes that are formed at the ends of the light guide body holding groove to introduce the end portions of the light guide body into the housing, and a housing section that houses the light emitting element and the light emitting element control unit.

According to the present invention, since the primary light emitting unit and the secondary light emitting unit are provided, the interior of the automobile can be illuminated by the primary light emitting unit, and, at the same time, decorative illumination can be provided by the secondary light emitting unit. Thus, a decorative effect can be produced inside the automobile without using another light emitting device attached in the automobile.

Furthermore, since the light guide body is U-shaped, light diffusion from the curved part of the light guide body is facilitated, and the light emission is improved. Thus, compared with a straight light guide body, a high decorative effect can be produced.

Furthermore, since the paired light emitting elements launch light into the ends of the light guide body, a sufficient quantity of light can be achieved over the length of the light guide body, while, if the light is launched into the light guide body only at one end thereof, the quantity of light is insufficient at the other end.

Furthermore, according to the present invention, the light guide body holding groove has a pair of straight holding sections that extend straight along the side edges of the housing and an arc-shaped holding section that is curved along the front edge of the housing, the straight holding section has an engaging protrusion that slightly protrudes into the light guide holding groove in the vicinity of the insertion hole to lock the light guide body, and a base end through-hole opening into the housing that is formed in the bottom of the light guide holding groove at a position corresponding to the engaging protrusion, and the arc-shaped holding section has an engaging step section that is constituted by a slight step formed along the peripheral wall thereof to lock the light guide body, and a curved through-hole opening into the housing that is formed in the bottom of the light guide holding groove at the same position as the engaging step section.

According to the present invention, the light guide body can be prevented from dropping off from the light guide body holding groove by the engaging protrusions and the engaging step section and thus can be held in the housing with reliability. In addition, since the engaging protrusions protrude slightly, and the engaging step section is constituted by a slight step, the light guide body can be locked with reliability without inhibiting the light diffusion from the light guide body.

Furthermore, since the base end through-holes and the curved through-hole are provided, the ease of molding can be maintained even through the engaging protrusions and the engaging step section are formed in shaping of the resin into the housing. Furthermore, since the base end through-holes and the curved through-hole are provided, the material cost for the housing can be reduced, and the weight of the housing can be reduced.

Furthermore, the base end through-holes and the curved through-hole serve to diffuse the light launched into the light guide body by the light emitting elements uniformly over the length of the light guide body. When the light from the light emitting elements is launched into the light guide body held in the shape of the letter U, the quantity of diffused light is large in the vicinities of the insertion holes in the straight holding sections of the light guide body, which are adjacent to the positions where the light is launched by the light emitting elements, and in the arc-shaped holding section of the light guide body, which provides increased internal reflection, and the quantity of diffused light is small in parts of the light guide body which are held in the straight holding sections distant from the insertion holes. Thus, according to the present invention, the base end through-holes and the curved through-hole are provided at the positions in the light guide body where the quantity of diffused light is large, thereby directing some of the diffused light in the light guide body to the inside of the housing, thereby controlling an excessive quantity of diffused light. Thus, the quantity of light can be made substantially uniform over the light guide body.

Here, it is preferable that the light emitting elements and the light emitting element control unit are provided integrally on a planar substrate, and the substrate is connected to the housing at a position at outer end of the arc-shaped holding section of the light guide holding groove and at a position of the housing located to the interior of the light guide holding groove. Since the curved through-hole is formed in the arc-shaped holding section of the light guide body holding groove, the parts of the housing at the ends of the arc-shaped holding section are relatively susceptible to bending. However, since the parts of the housing at the ends of the arc-shaped holding section of the light guide body and a part of the housing surrounded by the light guide holding groove are connected to each other via the substrate, the parts of the housing at the ends of the arc-shaped holding section can be prevented from being bent, and the rigidity of the housing can be enhanced.

Furthermore, it is preferable that the substrate has a highly bright color at least in areas thereof associated with the base end through-holes in the straight holding sections and the curved through-hole in the arc-shaped holding section in a surface on which the light emitting elements are mounted. Thus, when the light guide body is attached, the light emitted from the side of the light guide body facing the substrate can be prevented from being absorbed in the substrate, thereby making the light guide body emit light efficiently.

Furthermore, according to the present invention, it is preferable that the light emitting element that launches light into the light guide body selectively emits light of plural colors via the light emitting element control unit. Thus, the light guide body can be made to emit light of a desired color, and an atmosphere desired by an occupant can be easily produced, so that the decorative effect can be further enhanced.

Furthermore, according to the present invention, it is preferable that the housing has a diffuse-transmission member that covers at least the light guide body and diffuses the light from the light guide body. The diffuse-transmission sheet can obscure the outline of the light guide body to make the light soft, and thus, the quality of illumination can be further improved.

DETAILED DESCRIPTION OF THE PREFERRED EMBODIMENTS

Figure 1:
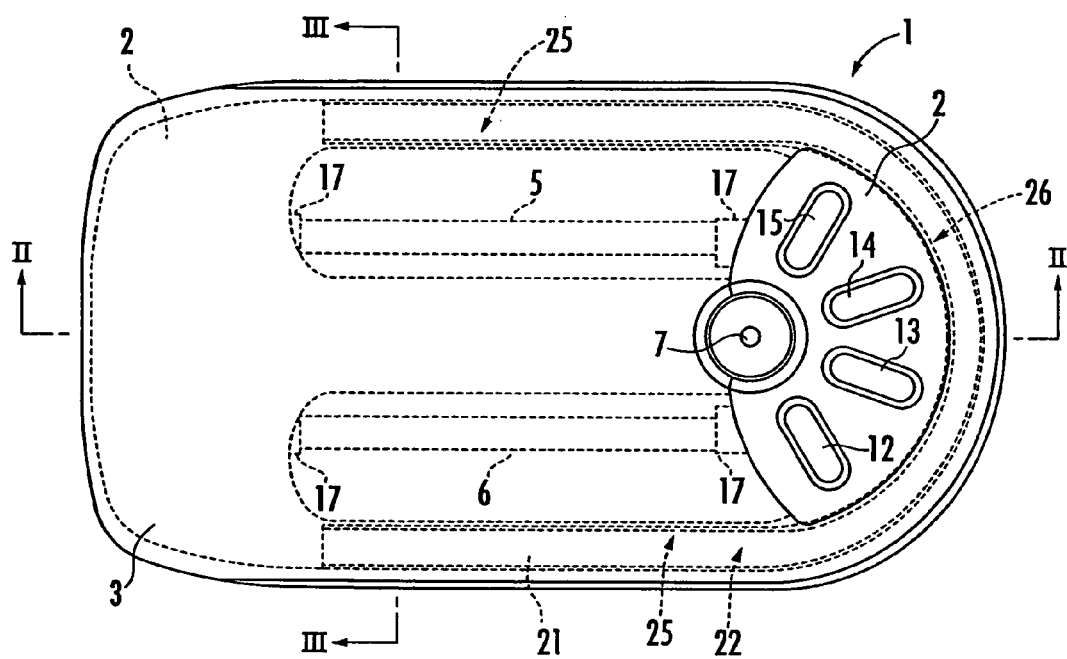
FIG. 1 is a plan view of an illuminator according to an embodiment of the present invention.
Figure 2:
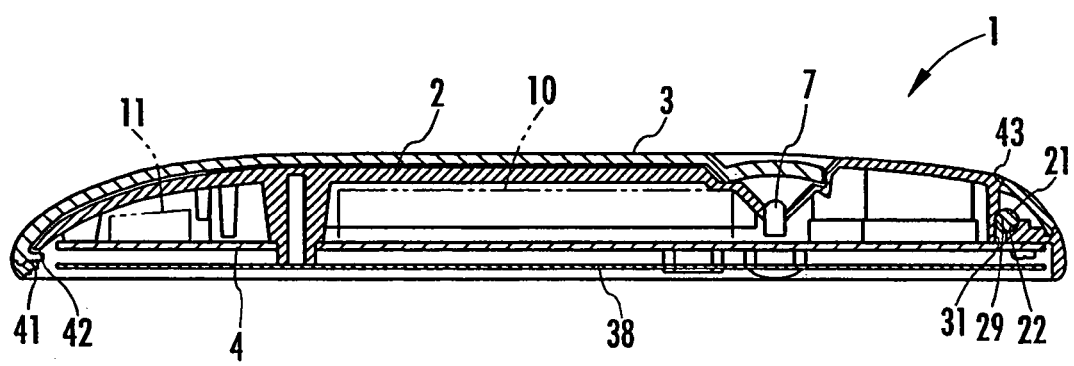
FIG. 2 is a cross sectional view of the illuminator taken along the line II—II in FIG. 1.
Figure 3:
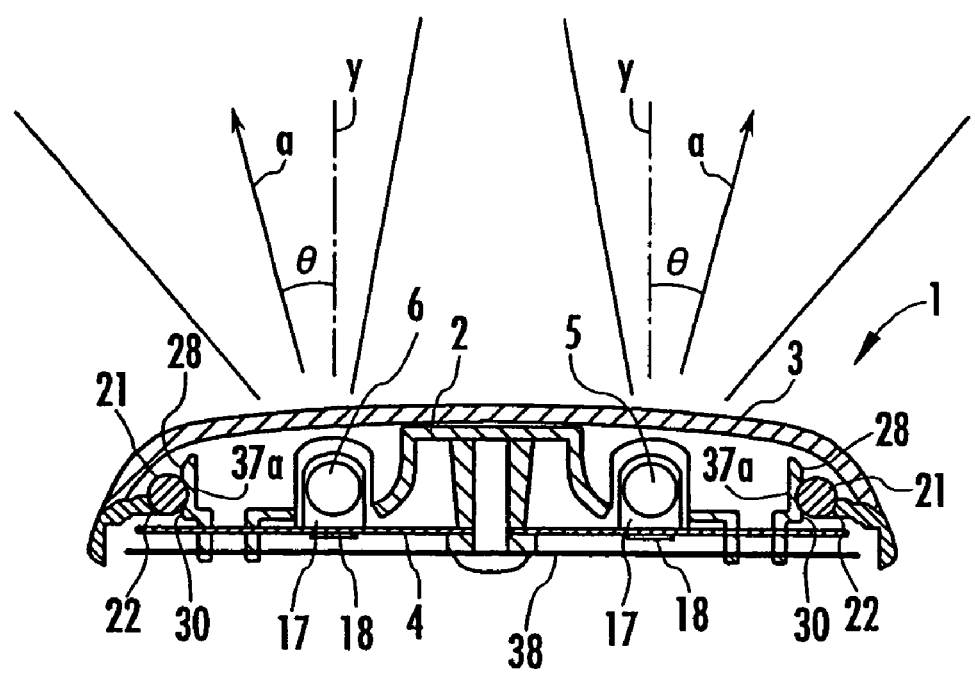
FIG. 3 is a cross sectional view of the illuminator taken along the line III—III in FIG. 1.
Figure 4:
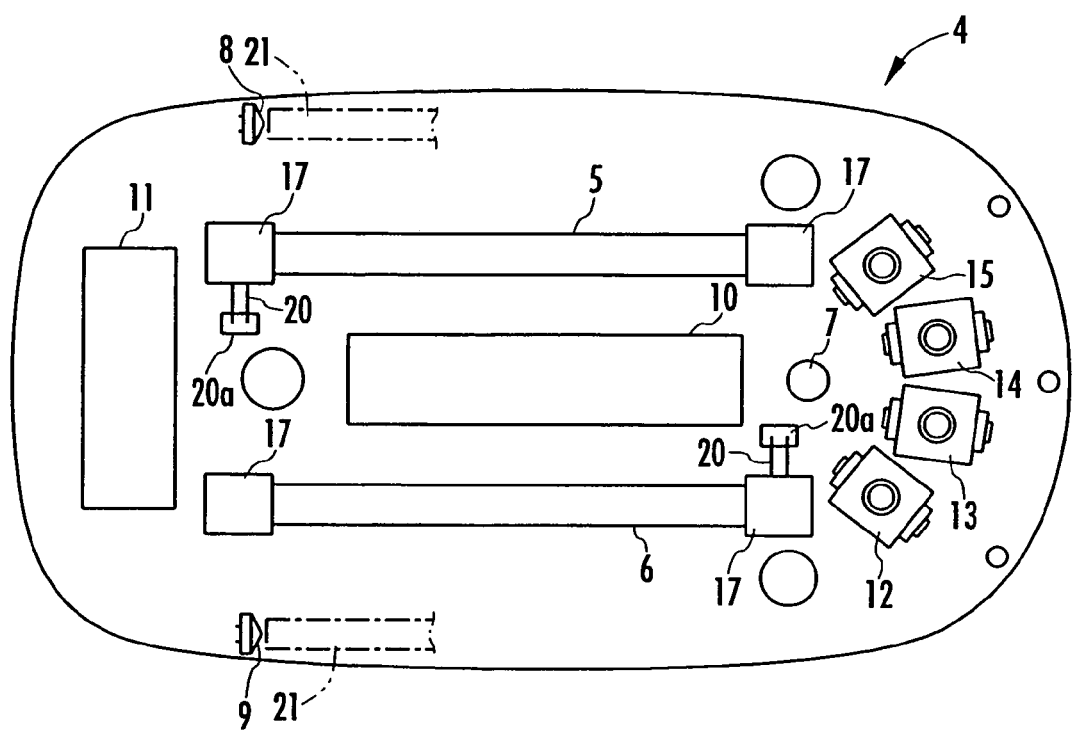
FIG. 4 is a plan view of a circuit board.
Figure 5:
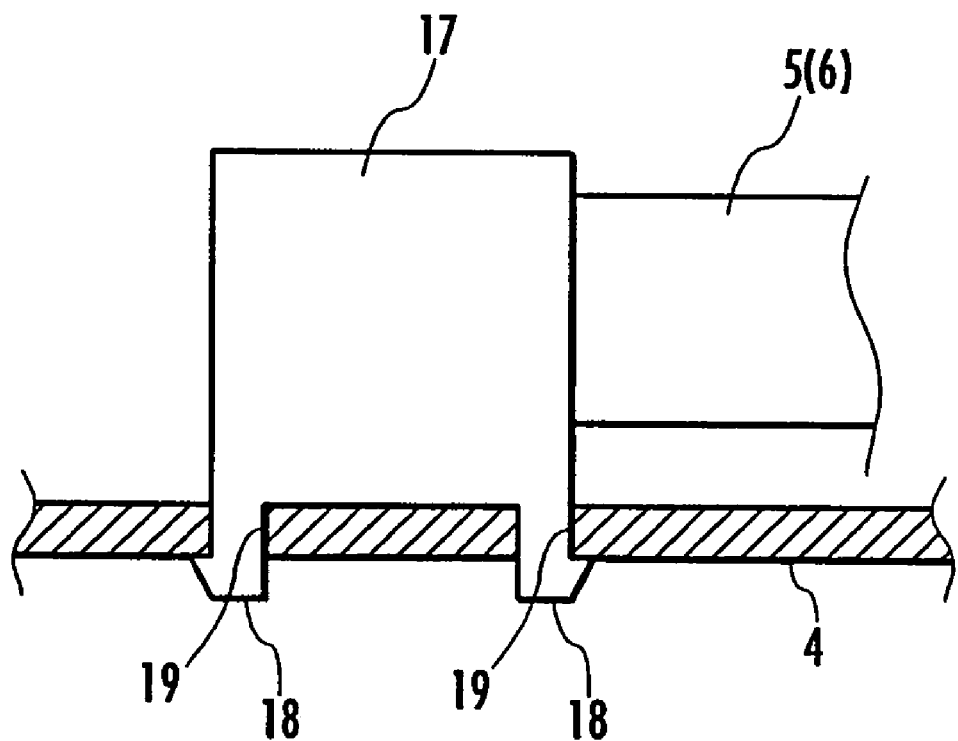
FIG. 5 is a cross sectional view of a part of the circuit board.
Figure 6:
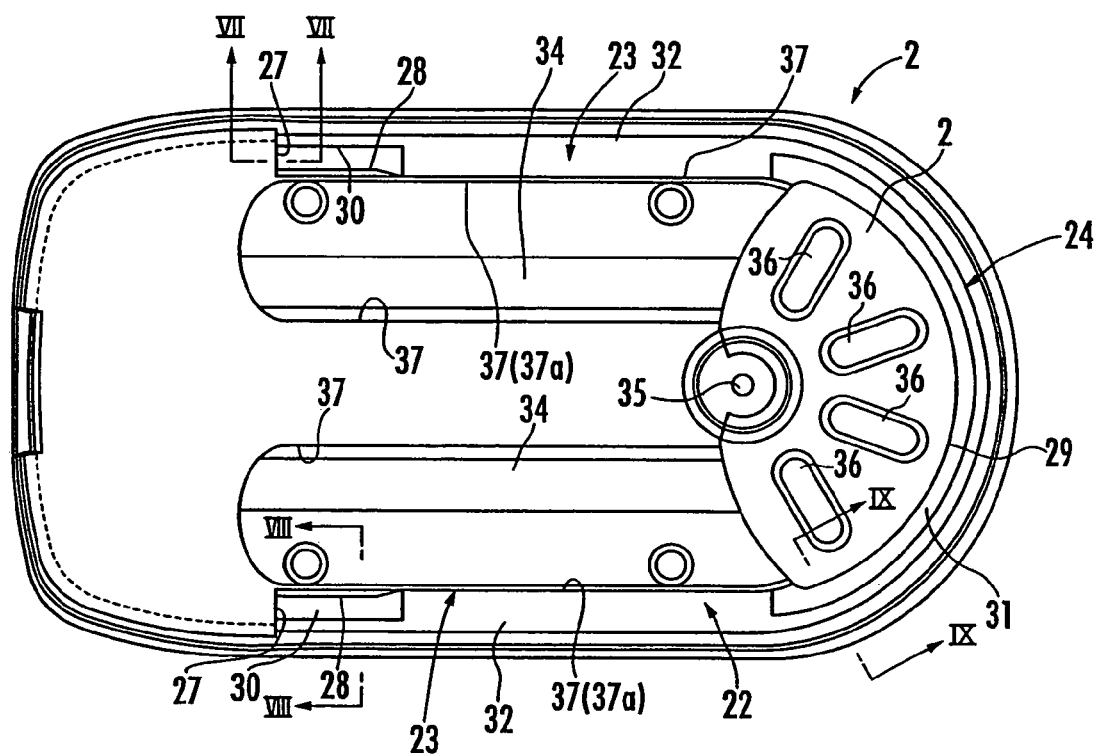
FIG. 6 is a plan view of a housing.
Figure 7:
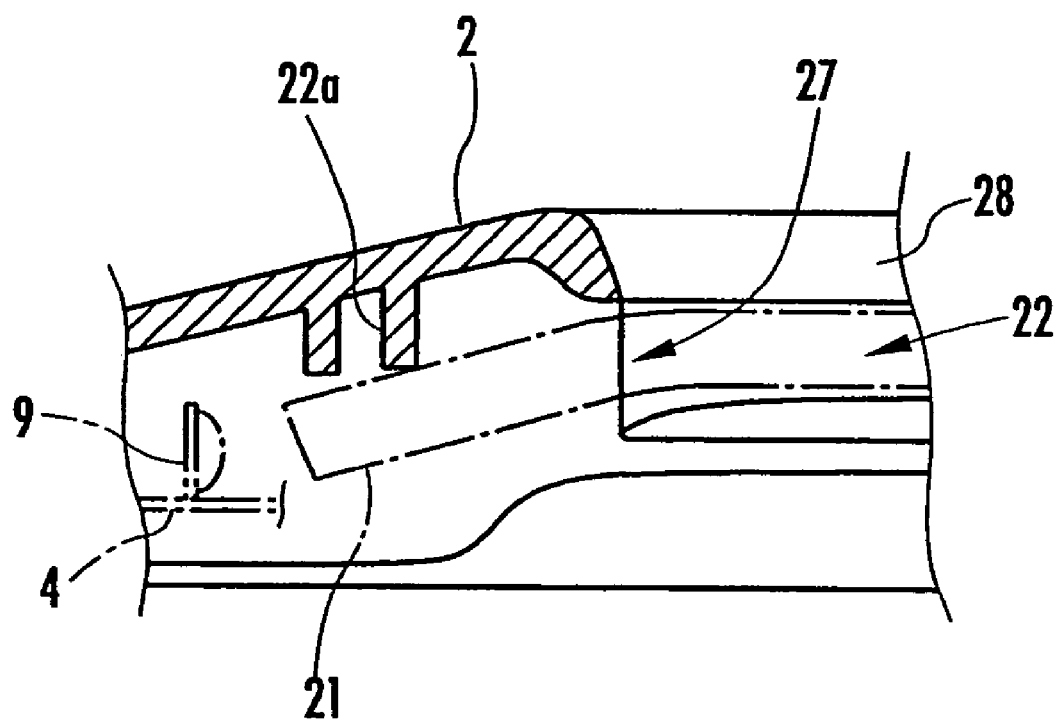
FIG. 7 is a cross sectional view of the housing taken along the line VII—VII in FIG. 6.
Figure 8:
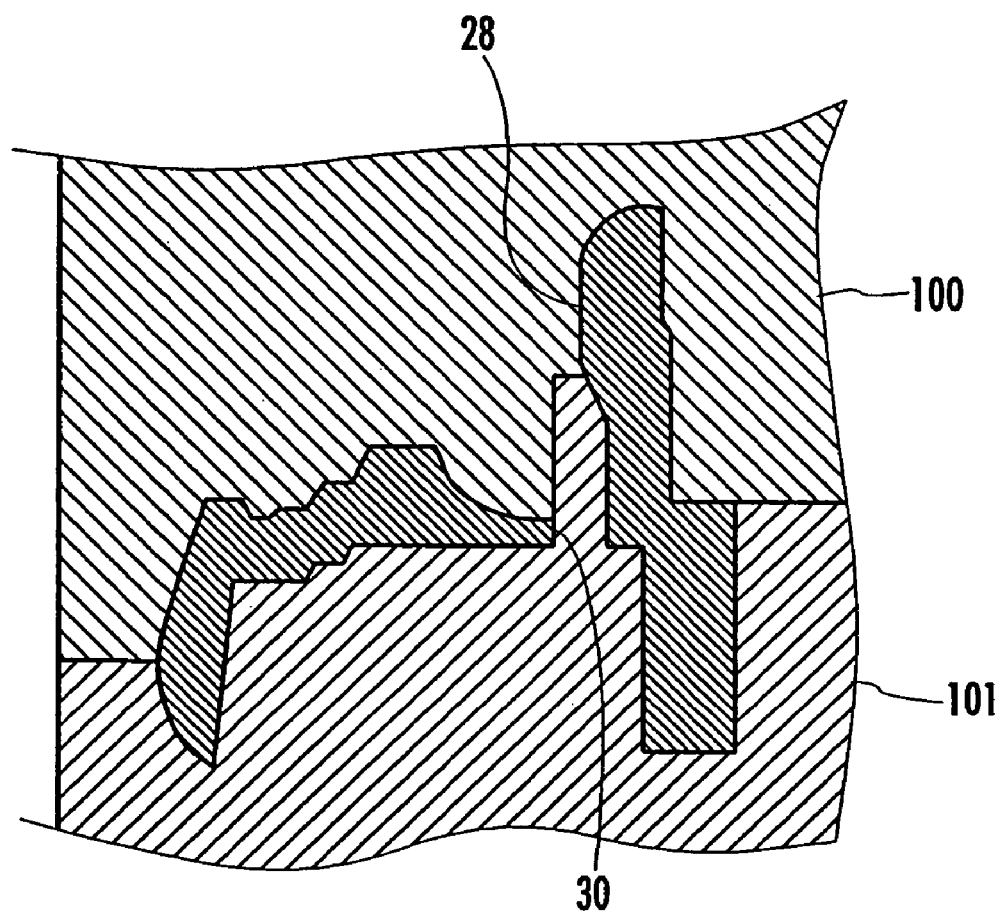
FIG. 8 is a cross sectional view of the housing being formed taken along the line VIII—VIII in FIG. 6.
Figure 9:
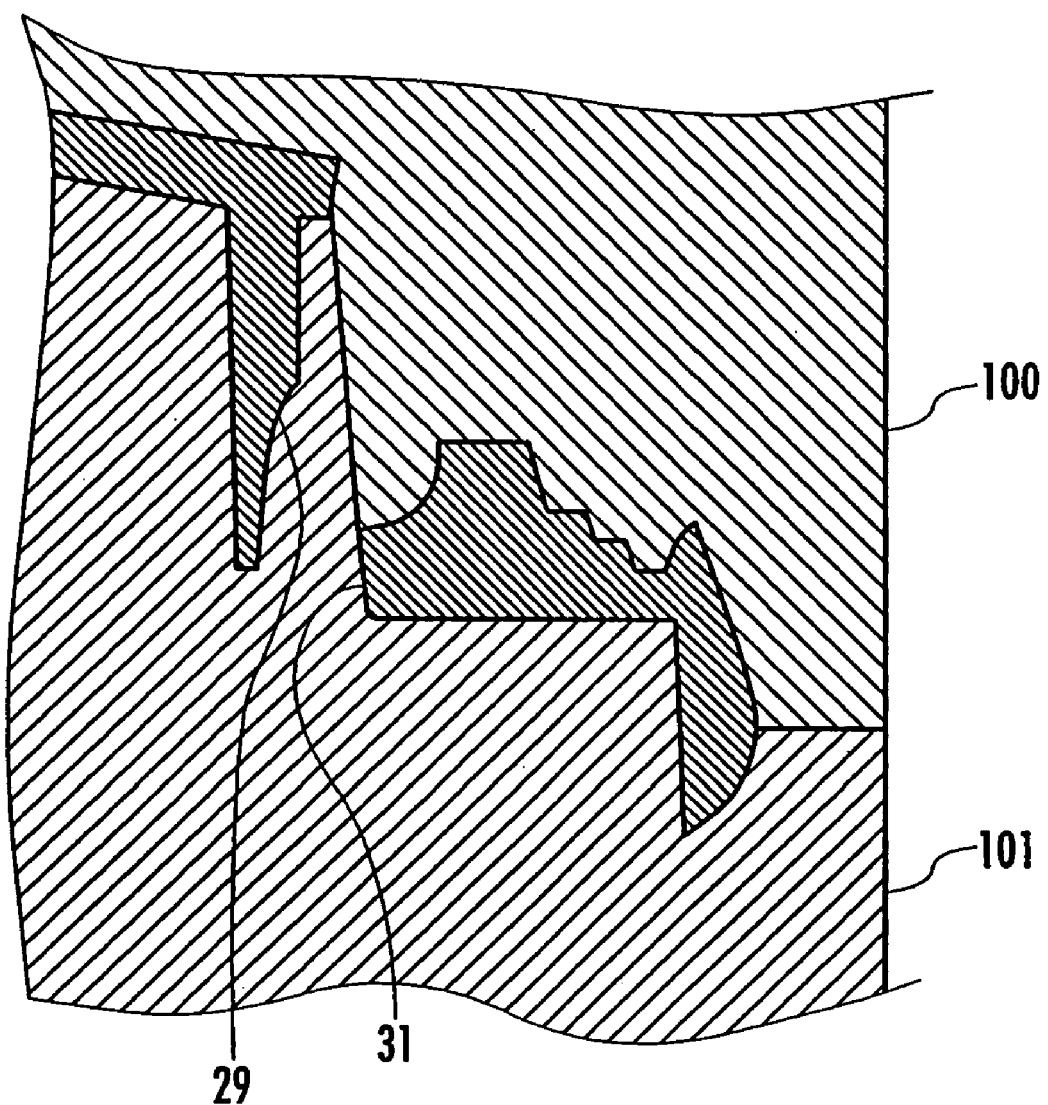
FIG. 9 is a cross sectional view of the housing being formed taken along the line IX—IX in FIG. 6.
Figure 10:
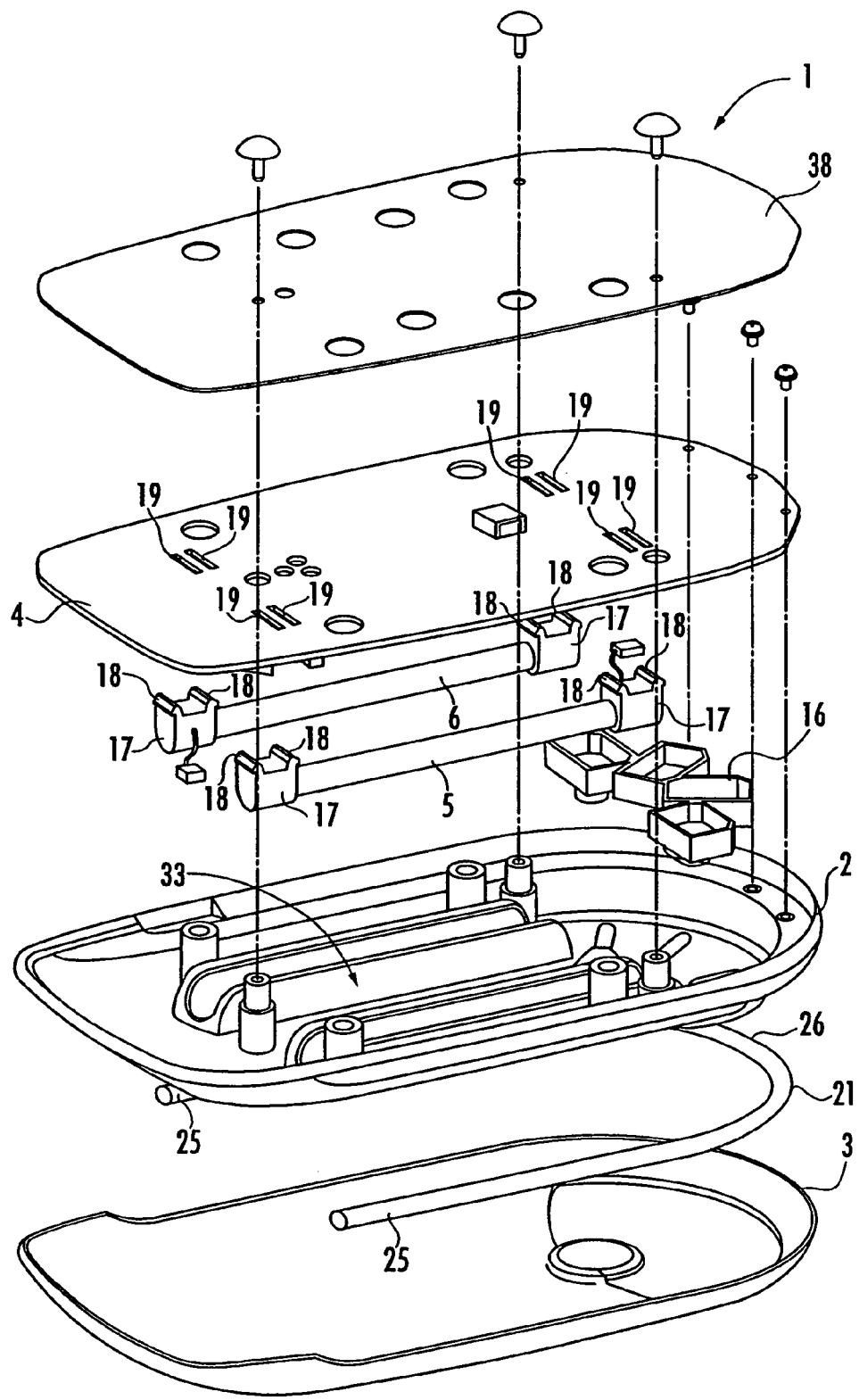
FIG. 10 is an exploded perspective view of the illuminator according to the embodiment.
Figure 11:
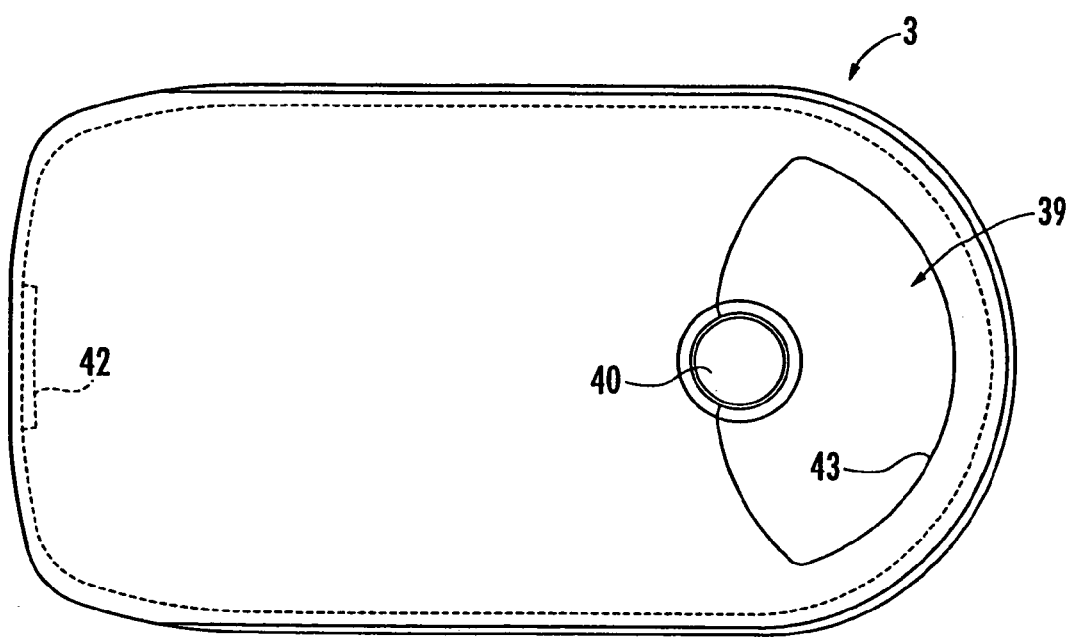
FIG. 11 is a plan view of an optically transparent cover.
Figure 12:
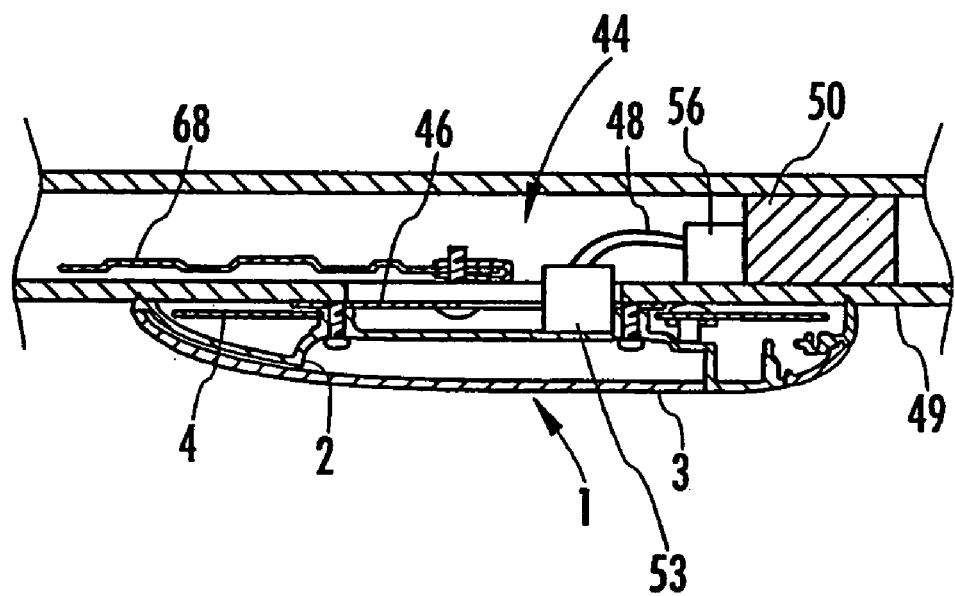
FIG. 12 is a cross sectional view of the illuminator attached to a ceiling of an automobile.
Figure 13:
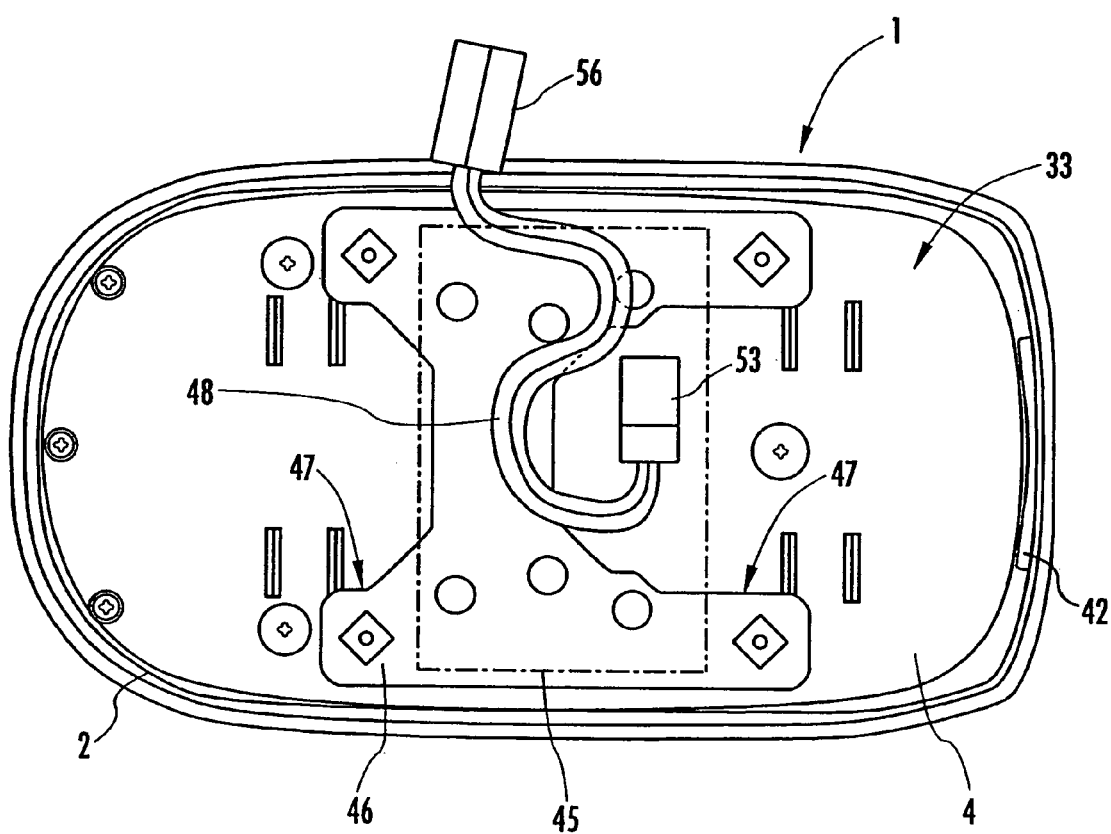
FIG. 13 shows an attaching member.
Figure 14:
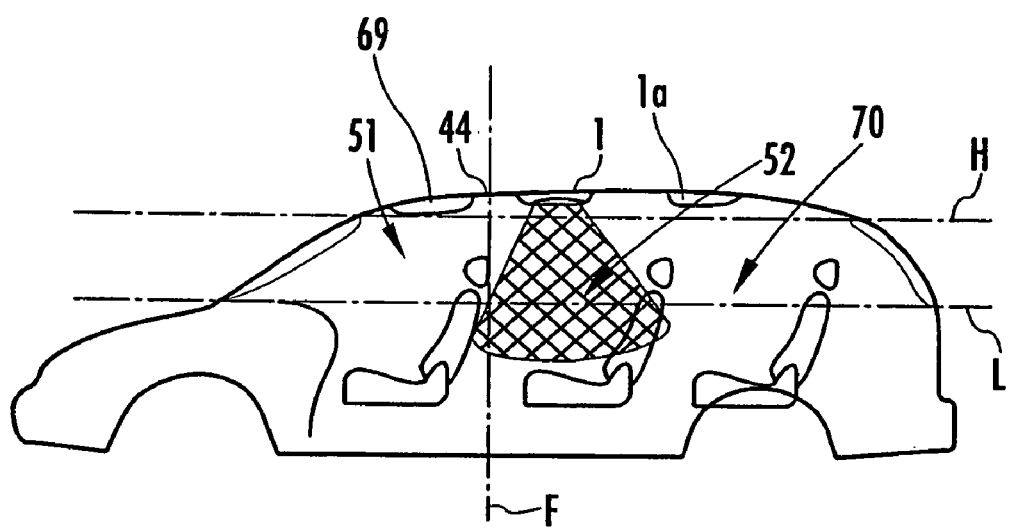
FIG. 14 is a cross sectional view of an automobile for illustrating the interior thereof.
Figure 15:
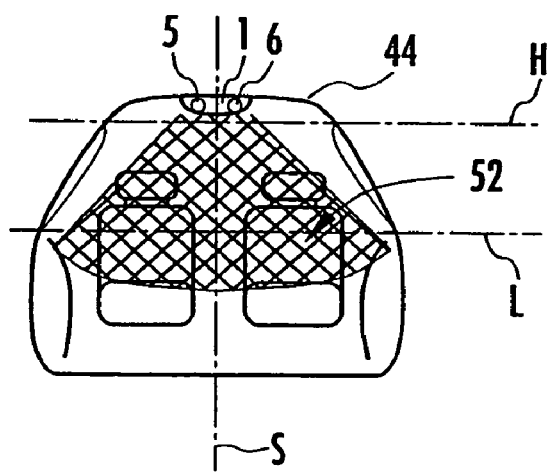
FIG. 15 is another cross sectional view of the automobile for illustrating the interior thereof.
Figure 16:
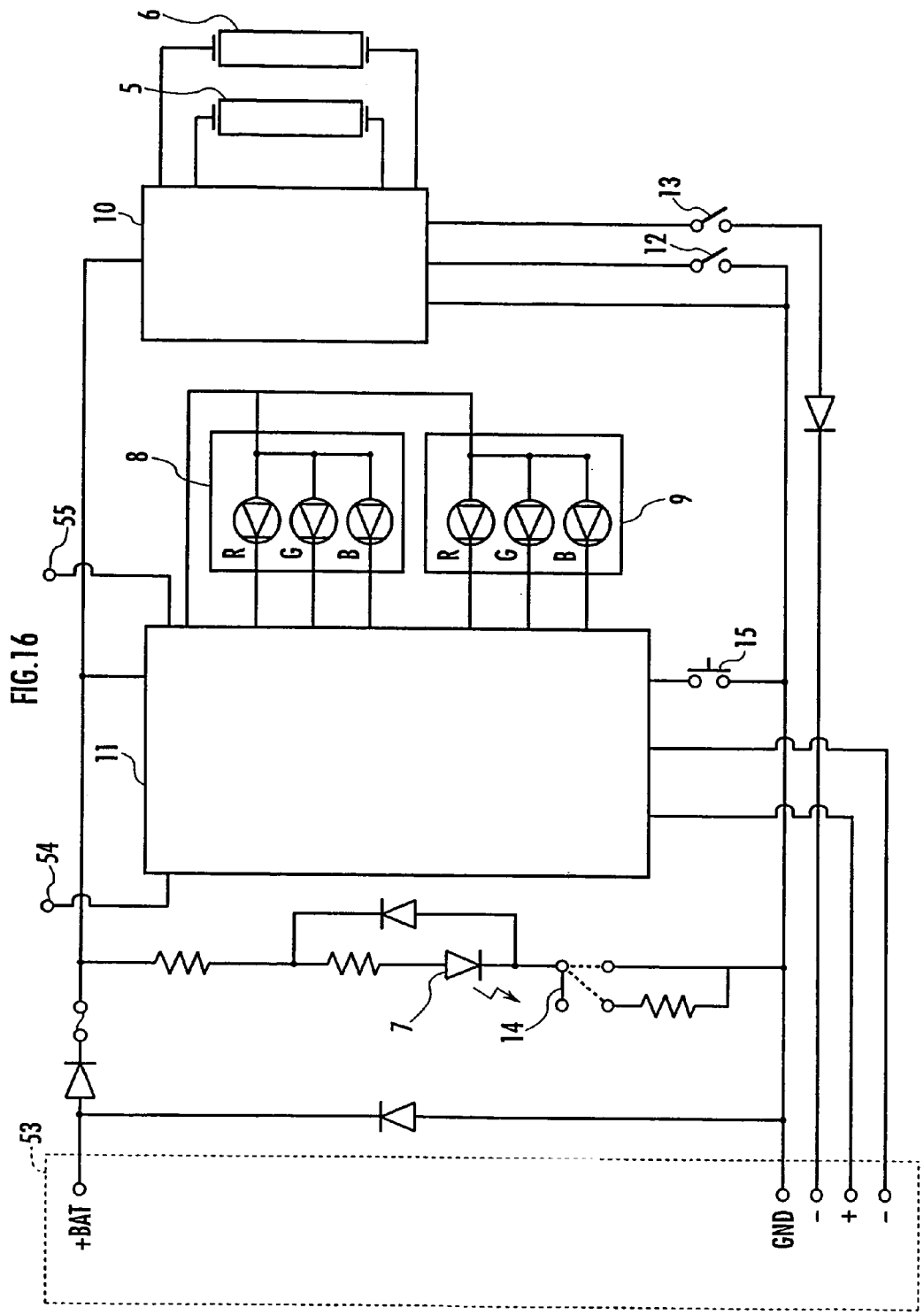
FIG. 16 is a block diagram showing an electric circuit according to the embodiment.

An embodiment of the present invention will be described with reference to the drawings. FIG. 1 is a plan view of an illuminator according to this embodiment, FIG. 2 is a cross sectional view of the illuminator taken along the line II—II in FIG. 1, FIG. 3 is a cross sectional view of the illuminator taken along the line III—III in FIG. 1, FIG. 4 is a plan view of a circuit board, FIG. 5 is a cross sectional view of a part of the circuit board, FIG. 6 is a plan view of a housing, FIG. 7 is a cross sectional view of the housing taken along the line VII—VII in FIG. 6, FIG. 8 is a cross sectional view of the housing being formed taken along the line VIII—VIII in FIG. 6, FIG. 9 is a cross sectional view of the housing being formed taken along the line IX—IX in FIG. 6, FIG. 10 is an exploded perspective view of the illuminator according to this embodiment, FIG. 11 is a plan view of an optically transparent cover, FIG. 12 is a cross sectional view of the illuminator attached to the ceiling of an automobile, FIG. 13 shows an attaching member, FIG. 14 is a cross sectional view of an automobile for illustrating the interior thereof, FIG. 15 is another cross sectional view of the automobile for illustrating the interior thereof, and FIG. 16 is a block diagram showing an electric circuit according to this embodiment.

As shown in FIG. 1, viewed from the outside, an illuminator 1 according to this embodiment has a housing 2 and an optically transparent cover 3 on the housing 2. As described later, the housing 2 supports a light guide body 21 (for example, an optical fiber) and houses a circuit board 4 (which is a circuit board according to the invention) as shown in FIGS. 2 and 3.

First, the circuit board 4 in the housing 2 and components of the circuit board 4 will be described. The circuit board 4 includes a pair of cold cathode tubes 5 and 6, a spot light emitting element 7 and a pair of multicolor light emitting elements 8 and 9, which serve as light sources. In a space between the paired cold cathode tubes 5 and 6 on the circuit board 4, a cold cathode tube driving circuit 10, such as an inverter, for driving the cold cathode tubes 5 and 6 is provided. The cold cathode tubes 5, 6, which constitute a "primary light emitting unit" of the invention, each comprise: a glass tube containing adequate amounts of mercury and an inert gas (for example, argon, neon or a mixed gas) and having the inner wall coated with a fluorophor; and electrodes provided at the ends of the glass tube or on the side wall of the glass tube along the semiperimeter thereof. When a high voltage is applied between the electrodes, electrons are emitted from the electrodes and collide with mercury molecules to produce ultraviolet rays, which, in turn, causes the fluorophor to emit visible light. In the cold cathode tubes 5, 6, the semiperimeter of the side wall of the glass tube on which the electrode is provided does not emit light, and the semiperimeter of the side wall of the glass tube on which no electrode is provided emits relatively intense light. Therefore, the light from the cold cathode tubes 5, 6 has a relatively high directivity. In addition, the cold cathode tubes 5, 6 typically have a long life of 10 thousands hours or more, and the glass tube can have an extremely small diameter.

In addition, in a rearward space on the circuit board 4, there is provided a multicolor light emitting element control circuit 11 that controls light emission of the pair of multicolor light emitting elements 8 and 9. The multicolor light emitting elements 8 and 9 are "light emitting elements" according to the present invention, and the multicolor light emitting element control circuit 11 is a "light emitting element control unit" according to the present invention. In a forward space on the circuit board 4, there are provided a plurality of (four, in this embodiment) manipulation switches 12, 13, 14 and 15. The manipulation switches 12, 13, 14 and 15 are each covered with a switch cover 16 made of rubber to prevent contact failure due to intrusion of dust or the like.

An electrode covering member 17 made of an elastic soft synthetic resin or the like (silicon rubber, in this embodiment) is attached to each of the longitudinal ends of each of the cold cathode tubes 5 and 6. As shown in the partial cross sectional view of FIG. 5, the electrode covering member 17 is removably attached to the circuit board 4 with a claw 18 extending from the bottom of the electrode covering member 17 being inserted to and engaged with an engaging hole 19 formed in the circuit board 4. Furthermore, as shown in FIG. 4, each cold cathode tube has an electric supply lead 20 extending from one of the electrode covering members 17, and the electric supply lead 20 is removably connected to the circuit board 4 with a connector 20a and electrically connected to the cold cathode tube driving circuit 10 via a wiring pattern of the circuit board 4. Thus, each cold cathode tube 5, 6 can be readily attached to the circuit board 4. In addition, since the electrode covering member 17 is made of a soft synthetic resin (silicon rubber) or the like, vibrations occurring when the automobile runs can be absorbed adequately.

The multicolor light emitting elements 8 and 9 are LEDs that can selectively emit light of plural colors under the control of the multicolor light emitting element control circuit 11 and each provided near either side edge of the circuit board 4. Each of the multicolor light emitting elements 8 and 9 is positioned so as to face one end of the light guide body 21 supported by the housing 2 as described later, and the light emitted from each of the multicolor light emitting elements 8 and 9 is incident on the end of the light guide body 21. The multicolor light emitting elements 8 and 9, the multicolor light emitting element control circuit 11 and the light guide body 21 according to this embodiment constitute a "secondary light emitting unit" according to the present invention. While the LEDs capable of selectively emitting light of plural colors are used as the multicolor light emitting elements 8 and 9 in this embodiment, a set of LEDs that emit light of different colors may be used, for example (not shown).

As the spot light emitting element 7, an LED that emits light of a color close to the color of natural light is used. As shown in FIG. 4, the spot light emitting element 7 is provided in a space between the cold cathode tubes 5, 6 and the manipulation switches 12, 13, 14, 15 on the circuit board 4.

The areas in the surface of the circuit board 4 that face the light sources preferably have a highly bright color. In this embodiment, the areas have a white color. Thus, the light from each light source can be prevented from being absorbed by the circuit board 4 and can be utilized efficiently.

Now, the housing 2 will be described in detail. As shown in FIG. 6, the housing 2 is made of a synthetic resin and has a light guide body holding groove 22 for holding the light guide body 21 which extends along the circumference from one side to the other side via the forward edge. The light guide body holding groove 22 comprises a pair of straight holding sections 23 extending straight along either side edge of the housing 2 and an arc shaped holding section 24 that is curved along the forward edge of the housing 2. Once fitted into and held by the light guide body holding groove 22, as shown in FIG. 1, the light guide body 21 has a pair of straight sections 25 extending along the side edges of the housing 2 and a curved section 26 extending along the forward edge of the housing 2, and thus, has a substantially U shape.

As shown in FIGS. 6 and 7, at the rearward ends of the straight holding sections 23 of the light guide holding groove 22, there are provided insertion holes 27 for inserting the end portions of the light guide body 21 to the inside of the housing 2. As shown in FIG. 7, the housing 2 has a projection 27a formed on the inner surface near the insertion hole 27. The end portion of the light guide body 21 inserted through the insertion hole 27 is slightly bent by the projection 27a so as to precisely face the multicolor light emitting element 8 (9) on the circuit board 4. Besides, as shown in FIGS. 6 and 3, at the rearward end of the straight holding section 23, there is formed an engaging protrusion 28 that protrudes slightly into the groove and has a smooth ridge line (that is, extremely slightly not to cover the light guide body 21). The engaging protrusion 28 abuts against the light guide body 21 from the inner side thereof to prevent the light guide body 21 from dropping off. Furthermore, since the engaging protrusion 28 protrudes slightly and has a smooth ridge line, the engaging protrusion 28 can surely lock the light guide body 21 without inhibiting the diffusion of the light from the light guide body 21.

Furthermore, as shown in FIG. 2, in the light guide body holding groove 22, a relatively low engaging step section 29 (specifically, that is low enough to avoid covering the light guide body 21) is formed along the peripheral wall of the arc-shaped holding section 24. The engaging step section 29 abuts against the light guide body 21 from the inner side thereof to prevent the light guide body 21 from dropping off the arc-shaped holding section 24 of the light guide body holding groove 22. Furthermore, since the engaging step section 29 is a relatively low step, the engaging step section 29 can surely lock the light guide body 21 without inhibiting the diffusion of the light from the light guide body 21.

In addition, as shown in FIG. 6, a base end through-hole 30 that opens into the housing 2 is formed in the bottom of the light guide holding groove 22 at a position associated with the engaging protrusion 28 (that is, near the insertion hole 27). The base end through-hole 30 serves to maintain the ease of molding even if the engaging protrusion 28 is formed during shaping of the resin into the housing 2. That is, as shown in FIG. 8, the engaging protrusion 28 can be easily formed using only two split molds, that is, an upper mold 100 and a lower mold 101, and the upper mold 100 and the lower mold 101 can be easily separated from the engaging protrusion 28. Similarly, a curved through-hole 31 that opens into the housing 2 is formed in the bottom of the light guide holding groove 22 at a position associated with the engaging step section 29. The curved through-hole 31 serves to maintain the ease of molding even if the engaging step section 29 is formed during shaping of the resin into the housing 2. That is, as shown in FIG. 9, the engaging step section 29 can be easily formed using only two split molds, that is, an upper mold 100 and a lower mold 101, and the upper mold 100 and the lower mold 101 can be easily separated from the engaging step section 29.

In addition, the light guide body holding groove 22 has an abutting bottom section 32 between the base end through-hole 30 and the curved through-hole 31 (which is the straight holding section 23 excluding the base end through-hole 30). Forming the base end through-holes 30 and the curved through-hole 31 can reduce the weight of the housing 2, and providing the abutting bottom section 32 allows the housing 2 to have an adequate strength. In addition, the base end through-holes 30, the curved through-hole 31 and the abutting bottom section 32 allows the light launched from the multicolor light emitting elements 8 and 9 into the light guide body 21 to be substantially uniformly diffused over the length of the light guide body 21. That is, when the light from the multicolor light emitting elements 8 and 9 is incident on the end faces of the light guide body 21 held in the shape of the letter U, the quantity of diffused light is large near the insertion holes 27, which are adjacent to the incident positions of the light from the multicolor light emitting elements 8 and 9, and in the curved section 26 of the light guide body 21, which provides increased internal reflection, and the quantity of diffused light is small in the straight sections 25 distant from the insertion holes 27. According to this embodiment, since the base end through-holes 30 and the curved through-hole 31 are provided at the positions in the light guide body 21 where the quantity of diffused light is large, an excessive quantity of diffused light can be controlled by directing some of the diffused light in the light guide body 21 to the inside of the housing 2. On the other hand, since the abutting bottom sections 32 are provided at the positions in the light guide body 21 where the quantity of diffused light is small, the diffused light can be reflected in the light guide body 21, thereby increasing the light diffused to the outside. In this way, the quantity of light can be made substantially uniform over the light guide body 21.

In addition, as shown in FIG. 10, a circuit board housing section 33 for housing the circuit board 4 is provided in the housing 2. As shown in FIG. 2, the circuit board 4 housed in the circuit board housing section 33 is screwed to the housing 2 at a position close to the rear of the housing 2 and at positions at the outer ends of the arc-shaped holding section 24 of the light guide body holding groove 22. In the housing 2, the outer ends of the arc-shaped holding section 24 are relatively susceptible to bending, because the curved through-hole 31 is formed in the arc-shaped holding section 24 of the light guide holding groove 22. However, the circuit board 4 screwed to the housing 2 serves as a reinforcing member, and thus, the rigidity of the housing 2 can be improved.

In addition, as shown in FIG. 6, the housing 2 has a pair of slit-like first light source apertures 34 that allow the cold cathode tubes 5, 6 to be exposed to the outside of the housing 2 when the circuit board 4 is attached to the circuit board housing section 33, a second light source aperture 35 that allows the spot light emitting element 7 to be exposed to the outside of the housing 2 when the circuit board 4 is attached to the circuit board housing section 33, and switch apertures 36 that allows the manipulation switches 12, 13, 14 and 15 to be exposed to the outside through the switch covers 16 when the circuit board 4 is attached to the circuit board housing section 33. Curved partition walls 37 are provided around the second light source aperture 35 and the first light source apertures 34. As shown in FIG. 3, an inner partition wall 37a, which constitutes an inner wall of the light guide body holding groove 22 between each cold cathode tube 5 (6) and the light guide body 21, has such a height that the tip end of the inner partition wall 37a does not abut against the optically transparent cover 3.

In addition, as shown in FIGS. 2 and 3, the outer edge of the housing 2 that abuts against the ceiling of the automobile is chamfered inward and is relatively sharp. In general, the ceiling of the automobile is covered with an interior covering material which is relatively soft. When the housing 2 is attached to the ceiling, the relatively sharp outer edge of the housing 2 digs into the interior covering material, so that the light can be surely prevented from leaking from the housing 2. Here, on the back side of the circuit board 4 that faces the ceiling of the automobile when the circuit board 4 is attached to the ceiling, the circuit board 4 preferably has a back cover plate 38 that prevents the elements and the wires on the circuit board 4 from coming into contact with the ceiling, as shown in FIG. 10.

Now, the optically transparent cover 3 will be described in detail. As shown in FIG. 11, the optically transparent cover 3 has a switch exposing section 39 for exposing the part of the housing 2 in which the switch apertures 36 are formed, and the cold cathode tubes 5, 6, the spot light emitting element 7 and the light guide body 21 that are exposed to the outside of the housing 2 are covered with the remaining part of the optically transparent cover 3. The optically transparent cover 3 is made of a transparent synthetic resin and has a spot lens section 40 at a position over the spot light emitting element 7. In addition, a translucent diffuse-transmission sheet (not shown) for diffusing light that does not inhibit light transmission is applied to the area other than the spot lens section 40. The diffuse-transmission sheet can expand the outline of the light source of the cold cathode tubes 5, 6 themselves without broadening the relatively high directivity of light emitted by the cold cathode tubes, prevent the cold cathode tubes 5 and 6 from being directly viewed and the light from being excessively bright and obscure the outline of the light guide body 21 to make the light soft. The optically transparent cover 3 can be provided with the function to diffuse light by applying the diffuse-transmission sheet to the optically transparent cover 3 or by processing the surface of the optically transparent cover 3 to have fine asperities. The optically transparent cover 3 with the diffuse-transmission sheet in this embodiment or the optically transparent cover 3 with fine asperities on the surface constitutes a diffuse transmissive member according to the present invention.

Furthermore, as shown in FIG. 2, the optically transparent cover 3 has an engaging protrusion 42 to be engaged with an engaging hole 41 formed in the rear edge of the housing 2 and a fitting section 43 to be fitted onto the inner wall of the light guide body holding groove 22 of the housing 2 and, therefore, is fixedly mounted onto the housing 2. Since the housing 2 is reinforced with the optically transparent cover 3, the rigidity of the housing 2 is further improved.

The illuminator 1 according to this embodiment thus configured is positioned in such a manner that the longitudinal direction of the cold cathode tubes 5, 6 is aligned with the longitudinal direction of the automobile and the front ends of the manipulation switches 12, 13, 14 and 15 are directed to the rear of the automobile. Here, the midpoint between the cold cathode tubes 5 and 6 is positioned on a longitudinal center line of the automobile (specifically, the line II—II in FIG. 1 corresponds to the center line of the automobile). Alternatively, the illuminator 1 may be positioned with the front ends of the manipulation switches 12, 13, 14 and 15 being directed to the front of the automobile.

That is, any orientation of the illuminator 1 can be appropriately chosen depending on the type or shape of the automobile (for example, the dimensions of the interior), as far as the longitudinal direction of the cold cathode tubes 5 and 6 corresponds to the longitudinal direction of the automobile, and the midpoint between the cold cathode tubes 5 and 6 is positioned on a longitudinal center line of the automobile.

To attach the illuminator 1 according to this embodiment to the ceiling of the automobile, as shown in FIG. 12, an attaching member 46 is first screwed to a ceiling 44 so as to cover an opening 45 in the ceiling 44 (shown by the alternate long and short dash line in FIG. 13). Then, the circuit board 4 with the housing 2 is attached to the attaching member 46. Reference numeral 68 in FIG. 12 denotes a connecting member provided in the automobile. As shown in FIG. 13, the attaching member 46 is a metal plate having a pair of notches 47 and is substantially in the shape of the letter H. A distribution line 48, such as a signal line or electric supply line, extending to the back of the circuit board 4 can be introduced into the opening 45 in the ceiling 44 via the notches 47. The distribution line 48 is removably connected to the circuit board 4 with a connector 53 on the backside of the board. The distribution line 48 is connected to a connector 56 branched from the wiring of the automobile and serves to supply electricity to the illuminator and transmit a door-open/close signal to the illuminator. If the switches of the illuminator 1 are hard to manipulate due to an interior covering material 49 on the ceiling of the automobile being deformed, as shown in FIG. 12, a presser member 50 may be inserted inside the interior covering material 49.

As shown in FIGS. 14 and 15, the illuminator 1 according to the present invention is positioned on a longitudinal center line of the automobile, behind a driver's seat 51 (that is, behind the driver's seat moved to the rearmost position shown by the alternate long and short dash line F in FIG. 14) and above a backseat 52. A component located above the driver's seat 51 in FIG. 14 and denoted by reference numeral 69 is an illuminator for the front seats (that is, the driver's seat and the passenger seat) that can illuminate the left side and the right side separately. With the illuminator 1 mounted above the backseat 52, as shown in FIG. 15, the cold cathode tube 5 is located on the right side of the longitudinal center line of the automobile (the position indicated by the alternate long and short dash line S in FIG. 15), and the cold cathode tube 6 is located on the left side of the longitudinal center line of the automobile (the position indicated by the alternate long and short dash line S in FIG. 15). Since the cold cathode tubes 5 and 6 have a relatively high directivity, as shown in FIG. 14, by using the cold cathode tubes 5 and 6 to illuminate the backseat 52, the illuminator 1 according to this embodiment can prevent the driver's seat 51 from being illuminated and can achieve a sufficient quantity of light with a relatively low electric power on the side of the backseat 52. In addition, as shown in FIG. 15, the cold cathode tubes 5 and 6 each have a primary optical axis (that is, an optical axis at the center of the illumination range of the cold cathode tube 5 (6)) inclined at a predetermined angle in the lateral direction of the automobile so that the outer perimeter of the illumination range is lower than the lower edge of a window of the automobile. The inclination angle of each cold cathode tube 5 (6) is determined based on the distance from the cold cathode tube 5 (6) to the line connecting the lower edges of the left and right windows. Since the primary optical axes of the cold cathode tubes 5 and 6 are inclined oppositely in the lateral direction of the automobile to set the illumination ranges lower than the lower edges of the windows, the light can be prevented from being reflected from the windows to an occupant, and the cold cathode tubes 5 and 6 can be prevented from being reflected in the windows. According to this embodiment, in order for the illuminator attached to various automobiles to be adequately effective, as shown in FIG. 3, the primary optical axes are inclined oppositely: a primary optical axis a of the cold cathode tube 5 is inclined leftward (rightward in the figure, because FIG. 3 is a upside-down diagram) by an angle θ of 15° from a downward vertical line (shown as a upward vertical line y in FIG. 3, because FIG. 3 is a upside-down diagram); and a primary optical axis a of the cold cathode tube 6 is inclined rightward (leftward in the figure, because FIG. 3 is a upside-down diagram) by an angle θ of 15° from a downward vertical line (shown as a upward vertical line y in FIG. 3, because FIG. 3 is a upside-down diagram). According to various tests on a plurality of types of automobiles performed by the inventor, as for the illuminator 1 according to this embodiment, when the primary optical axis a of the cold cathode tube 5 is inclined leftward by an angle (θ in FIG. 3) of 10 to 20° from the downward vertical line, and the primary optical axis a of the cold cathode tube 6 is inclined rightward by an angle (θ in FIG. 3) of 10 to 20° from the downward vertical line, the backseat 52 can be adequately illuminated while preventing light reflection in the windows.

Furthermore, since the illuminator 1 according to this embodiment uses the cold cathode tubes 5 and 6, it can have smaller size than conventional illuminators using a fluorescent lamp and have a relatively small thickness. Since the illuminator 1 can have a relatively small thickness, the illuminator 1 can be accommodated under the slightly curved ceiling 44 in a state where the illuminator 1 is recessed above the line connecting the upper edges of the windows, although not shown in detail. Thus, the illuminator 1 can be prevented from being viewed by an occupant of another automobile.

Furthermore, the cold cathode tubes 5 and 6 turn on quickly when power is turned on, compared with conventional fluorescent lamps. For example, the cold cathode tubes can be associated with opening and closing of the doors to illuminate the interior quickly. In addition, the cold cathode tubes 5 and 6 advantageously have a longer life than conventional fluorescent lamps and require no maintenance, such as replacement.

Since the illuminator 1 according to this embodiment has the light guide body 21 as shown in FIG. 1, multicolor illumination can be provided around the illuminator 1, thereby producing an desired atmosphere by the illumination color in the automobile. Since the light from the multicolor light emitting elements 8 and 9 is incident on the both ends of the light guide body 21, a sufficient quantity of light can be provided over the length of the light guide body 21. In addition, as described above, since the light guide body holding groove 22 of the housing 2 that holds the light guide body 21 has the base end through-holes 30, the curved through-hole 31 and the abutting bottom sections 32, which make the quantity of light uniform over the light guide body 21, it is possible to present a fine spectacle to the occupant. In addition, for example, if the multicolor light emitting elements 8 and 9 emits light of different colors, the light guide body 21 can emit light of plural colors at the same time, and thus, an atmosphere the occupant desires can be readily produced. Furthermore, as shown in FIG. 2, through the optically transparent cover 3, the light in the housing 2 can be introduced from the engaging protrusion 42 engaged with the engaging hole 41 formed in the rear edge of the housing 2. Thus, it is possible to provide a beautiful illumination at the rear end of the housing 2.

Now, a method of manipulating the illuminator 1 according to this embodiment and an operation thereof will be described specifically. Referring to FIG. 16, the manipulation switch 12 is to turn on and off the cold cathode tubes 5 and 6. The manipulation switch 13 is to choose whether or not to associate the lighting of the cold cathode tubes 5 and 6 with the opening of the doors. The manipulation switch 14 is to select the quantity of light of the spot light emitting element 7 and to turn on and off the spot light emitting element 7. The manipulation switch 15 is to select colors of the multicolor light emitting elements 8 and 9 and to turn on and off the multicolor light emitting elements 8 and 9 via the multicolor light emitting element control circuit 11. Specifically, the multicolor light emitting elements 8 and 9 are switched among blue, light blue, green, yellow green, yellow, orange, magenta, automatic demonstration and OFF depending on the number of manipulations (pressings or the like) of the manipulation switch 15. For example, the automatic demonstration is to continuously change color at predetermined intervals. The multicolor light emitting element control circuit 11 can controls the multicolor light emitting elements 8 and 9 in a predetermined manner by detecting simultaneous manipulations of the manipulation switches 12 and 15. Specifically, for example, when no one is in the automobile, the multicolor light emitting elements 8 and 9 are controlled to turn on and off with a red color at predetermined intervals, in order for the automobile not to be stolen. As shown in FIG. 16, the connector 53 is connected to the wiring of the automobile for electric supply and input of a door-open/close signal.

In addition, the multicolor light emitting element control circuit 11 has an input section 54 for receiving a control signal from the outside and an output section 55 for outputting a signal indicating an operational status of the illuminator 1 to the outside. Incoming signals through the input section 54 primarily include a brake manipulation signal, a reverse manipulation signal and a direction indicator manipulation signal. If a brake manipulation signal is received at the input section 54, the multicolor light emitting control circuit 11 makes the multicolor light emitting elements 8 and 9 emit light of a predetermined color, such as red, and if a reverse manipulation signal is received, the multicolor light emitting control circuit 11 makes the multicolor light emitting elements 8 and 9 emit light of another predetermined color, such as white. Furthermore, if a direction indicator manipulation signal is received at the input section 54, the multicolor light emitting element control circuit 11 makes one of the multicolor light emitting elements 8 and 9 which is located on the side corresponding to the direction of the turning automobile blink with a predetermined color, such as orange. Thus, an occupant on the backseat can readily recognize the behavior of the automobile by checking the light emission of the light guide body 21 of the illuminator 1.

Other control signals may be received at the input section 54, depending on the information equipment mounted on the automobile. For example, various kinds of information about velocity, engine speed, temperature, time, door lock status (open or closed) may be input. For example, if a signal concerning temperature is input at the input section 54, the multicolor light emitting elements 8 and 9 can be made to emit light of a warm color when the temperature is low and to emit light of a cold color when the temperature is high. Alternatively, if an on-vehicle clock has a calendar function, a signal concerning the month and date can be input at the input section 54, and the colors of the multicolor light emitting elements 8 and 9 can be adjusted according to the season. Furthermore, a signal concerning the month and date can be input at the input section 54, and the multicolor light emitting elements 8 and 9 can be made to emit light of a predetermined color on the date of birth of the user of the automobile, for example.

Furthermore, a sound signal from an on-vehicle acoustic device can be input at the input section 54 as a control signal. In this case, the color or the quantity of light of the multicolor light emitting elements 8 and 9 can be changed depending on the pitch or intensity of the sound from the on-vehicle acoustic device.

Furthermore, although not shown, the illuminator 1 according to this embodiment may have a voice synthesis unit and provide voice information according to the control signal received at the input section 54. In this case, there can be provided not only sound information associated with the various information described above but also sound information about an operational status of the illuminator 1 (for example, what color is chosen for the multicolor light emitting element 8, 9), a manipulation procedure of the manipulation switches 12, 13, 14 and 15 or the like.

In this embodiment, a pair of cold cathode tubes 5 and 6 is used as a primary light emitting unit. However, the present invention is not limited thereto, and the primary light emitting unit may be a light bulb or a fluorescent lamp.

Furthermore, if the interior space of the automobile is relatively large, and the automobile has a third seat 70 as shown in FIG. 14, an illuminator 1a configured the same as the illuminator 1 according to this embodiment described above may be attached above the third seat. In this case, for example, the illuminator 1 located forward in the interior of the automobile may be attached with the front ends of the manipulation switches 12, 13, 14 and 15 being directed to the front of the automobile, and the illuminator 1a located rearward in the interior of the automobile may be attached with the front ends of the manipulation switches 12, 13, 14 and 15 being directed to the rear of the automobile.

Furthermore, the light guide body 21 adopted in this embodiment has a circular cross section. However, the present invention is not limited thereto, and the light guide body 21 may have a polygonal cross section (a rectangular, a hexagon or a star-shaped cross section, for example).

What is claimed is:

1. An interior illuminator for an automobile that is attached to a ceiling of the automobile, comprising:
   a primary light emitting unit for illuminating the interior of the automobile;
   a secondary light emitting unit provided around the primary light emitting unit; and
   a housing that holds said primary light emitting unit and said secondary light emitting unit,
   wherein said secondary light emitting unit has a transparent light guide body that is flexible and U-shaped, light emitting elements for launching light into the light guide body at the ends thereof, and a light emitting element control unit for controlling light emission of the light emitting elements,
   said housing has a light guide body holding groove that keeps the U-shape of said light guide body, a pair of insertion holes that are formed at the ends of said light guide body holding groove to introduce the end portions of said light guide body into the housing, and a housing section that houses said light emitting element and said light emitting element control unit, wherein said light guide body holding groove has a pair of straight holding sections that extend straight along the side edges of said housing and an arc-shaped holding section that is curved along the front edge of the housing, said straight holding section has an engaging protrusion that slightly protrudes into the light guide holding groove in the vicinity of said insertion hole to lock said light guide body, and a base end through-hole opening into the housing that is formed in a bottom of the light guide holding groove at a position corresponding to the engaging protrusion, and said arc-shaped holding section has an engaging step section that is constituted by a slight step formed along a peripheral wall thereof to lock said light guide body, and a curved through-hole opening into the housing that is formed in the bottom of the light guide holding groove at the same position as the engaging step section.

2. The interior illuminator for an automobile according to claim 1, wherein said light emitting elements and said light emitting element control unit are provided integrally on a planar substrate, and the substrate is connected to the housing either at a position at outer end of the arc-shaped holding section of said light guide holding groove or at a position of the housing located to an interior of the light guide holding groove.

3. The interior illuminator for an automobile according to claim 2, wherein said substrate has a highly bright color at least in areas thereof associated with the base end through-holes in said straight holding sections and the curved through-hole in said arc-shaped holding section in a surface on which said light emitting elements are mounted.

4. The interior illuminator for an automobile according to claim 1, wherein the light emitting element that launches light into said light guide body selectively emits light of plural colors via said light emitting element control unit.

5. The interior illuminator for an automobile according to claim 1, wherein said housing has a diffuse-transmission member that covers at least said light guide body and diffuses the light from the light guide body.

* * * * *